219-121
2/28/84 OR 4,434,350
SR

United States Patent [19] [11] 4,434,350
Flisikowski et al. [45] Feb. 28, 1984

[54] METHOD OF AND DEVICE FOR MANUFACTURING AN INK JET PRINTER

[75] Inventors: Peter Flisikowski, Hamburg; Werner Jeglinski, Bönningstedt, both of Fed. Rep. of Germany; Gerardus Jelmorini, Valkenswaard, Netherlands

[73] Assignee: U.S. Philips Corporation, New York, N.Y.

[21] Appl. No.: 355,838

[22] Filed: Mar. 8, 1982

[30] Foreign Application Priority Data

Apr. 2, 1981 [DE] Fed. Rep. of Germany ....... 3113239

[51] Int. Cl.³ .............................................. B23K 27/00
[52] U.S. Cl. ....................... 219/121 LC; 219/121 EC
[58] Field of Search ................. 219/121 LC, 121 LD, 219/121 EC, 121 ED; 346/140 PD, 75; 310/324

[56] References Cited

U.S. PATENT DOCUMENTS

| | | | |
|---|---|---|---|
| 3,708,798 | 1/1973 | Hildenbrand et al. | 346/140 PD |
| 3,747,120 | 7/1973 | Stemme | 346/140 PD |
| 4,005,440 | 1/1977 | Amberntsson et al. | 346/140 PD |
| 4,339,763 | 7/1982 | Kyser et al. | 346/140 PD |

*Primary Examiner*—C. L. Albritton
*Attorney, Agent, or Firm*—Robert S. Smith

[57] ABSTRACT

The pressure chambers (2) for the ejection of the ink are recessed in a body (9) of an ink jet printer. The chambers (2) are covered by a metal diaphragm (1). The pressure chambers (2) and the associated narrow passages (4) are formed in the body (9) by depression. Subsequently, the metal diaphragm (1) is connected to the body (9) by energy beam welding. The energy beam (31) is moved along the edges of the pressure chambers (2) and of the narrow passages (4). An electron beam or a laser beam may be used as the energy beam (31).

8 Claims, 7 Drawing Figures

METHOD OF AND DEVICE FOR MANUFACTURING AN INK JET PRINTER

BACKGROUND OF THE INVENTION

The invention relates to a method of and a device for manufacturing an ink jet printer, comprising at least one jet nozzle whose pressure chamber is recessed in a body and is covered by a metal diaphragm on which there is arranged a drive element for the ejection of ink droplets from the jet nozzle.

A printer of this kind is known from German Offenlegungsschrift No. 28 08 407. In a body there is recessed a pressure chamber which is covered by a metal diaphragm. The piezoelectric drive element is arranged over the diaphragm. One of the electrical supply leads to the drive element is connected to the metal diaphragm. Therefore, the diaphragm must be comparatively thick. The drive element, the diaphragm and the body are interconnected by means of layers of glue. In order to realize on the one hand a durable connection and on the other hand a suitable electrical transition, it is necessary that the glued joints are realized under a comparatively high pressure and with a comparatively long drying time. Therefore, the manufacture of such an ink jet printer is cumbersome and time consuming.

It is also known to screw the metal diaphragm onto the body. In order to obtain a vacuumtight connection, a large number of screws is required, notably when the ink jet printer comprises several pressure chambers and jet nozzles. The manufacture of such an ink jet printer is also cumbersome and time consuming. Moreover, vacuumtight sealing is not ensured.

The invention has for its object to provide a method of and a device for the manufacture of an ink jet printer which not only enables a simple and fast connection of the metal diaphragm to the body, but also the formation of the pressure chamber with a narrow passage connected thereto without substantial loss of time. Moreover, the device whereby such a method can be performed must have a simple construction.

SUMMARY OF THE INVENTION

To this end, the method in accordance with the invention is characterized in that the pressure chamber and a narrow passage are formed in the body by depression, the narrow passage connecting the pressure chamber to a supply duct for ink, the metal diaphragm being connected to the body in a vacuum-tight manner by energy beam welding for which purpose the energy means is guided along the edges of the pressure chamber and the narrow passage. The device for performing the method in accordance with the invention is characterized in that the device comprises a holder in which the body and the metal diaphragm can be positioned and retained with respect to one another, said holder comprising at least one opening which corresponds to the contour to be welded and along the edge of which the energy beam can be guided.

For the energy beam, use is preferably made of an electron beam or a laser beam. Such a beam can be deflected along the contour to be welded by microprocessors.

The depression of the pressure chamber and the narrow passage into the body is preferably performed during one operation and offers the advantages that a high processing speed can be obtained, notably when several pressure chambers are required, that the material strength is substantially improved by the material densifying under a high deformation pressure, and that the material fibres are not damaged, so that the pressure chamber is more corrosion resistant.

As a result of the energy beam welding, the time required for connecting a pressure chamber and a narrow passage to the metal diaphragm can be substantially reduced. Experiments have demonstrated that the total welded joint around the narrow passage and the pressure chamber can be formed in from approximately 1 to 2 seconds. Moreover, the material is thus exposed to only a small thermal load. Further advantages are formed by the high reproducibility of the weld contour, the cleanliness and the unambiguously vacuumtight connection. It is particularly advantageous to choose the beginning of the welded joint so that the points of welding which are situated comparatively near opposite one another are welded far apart in time.

BRIEF DESCRIPTION OF THE DRAWINGS

The invention will now be described with reference to some embodiments.

DESCRIPTION OF THE PREFERRED EMBODIMENT

Figure 1:
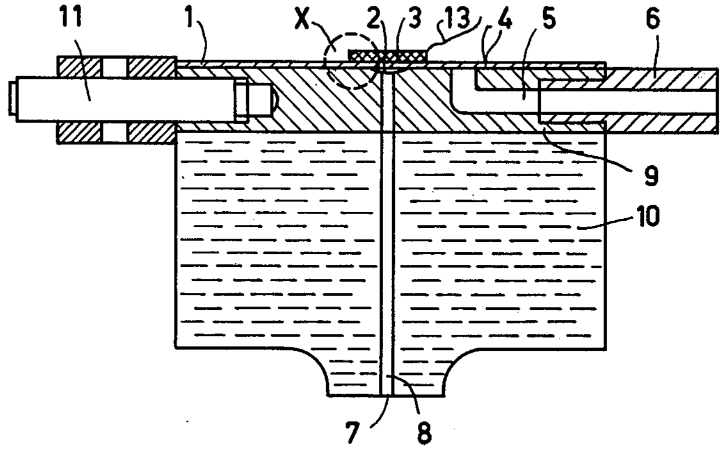
FIG. 1 is a sectional view of an embodiment of an ink jet printer comprising only one pressure chamber in accordance with the invention.
Figure 2:
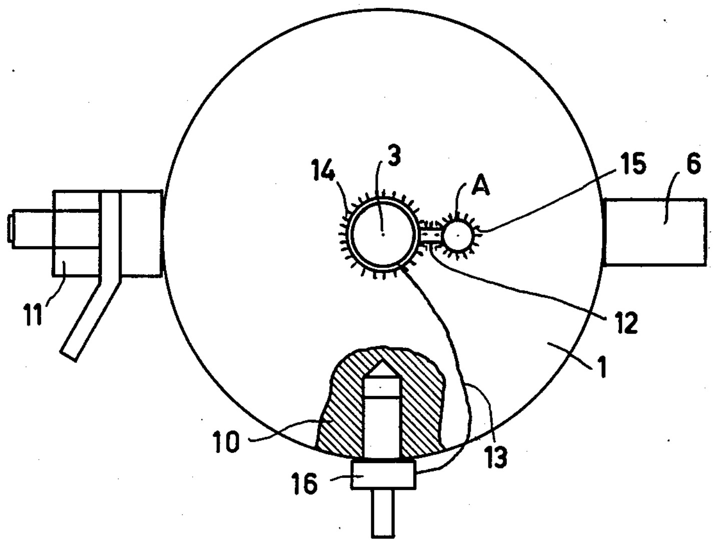
FIG. 2 is a plan view of the device shown in FIG. 1.

The printing head of an ink jet printer which is shown in the FIGS. 1 and 2 essentially consists of a body 9 in which there is situated a supply duct 5 for the ink. The supply duct 5 has associated with it a connection nipple 6. The supply duct 5 opens into a narrow passage 4, the other end of which laterally opens into a conical pressure chamber 2. In the centre of the pressure chamber 2 there is situated the beginning of a jet nozzle duct 8. On the body 9 there is glued a block 10 of an insulating material in which the jet nozzle duct 8 is prolonged as far as a nozzle 7. Instead of the block 10, use may also be made of a jet nozzle plate which is directly connected to the body in known manner. Also secured in the body 9 is an electrical connection 11 for the electrical lead to a drive element.

The pressure chamber 2 is covered by a metal diaphragm 1 which extends across the full width of the body 9. On the metal diaphragm 1 there is mounted the drive element 3, preferably by means of glue. It has been found that the gluing of the drive element is effective, because a comparatively brittle material is concerned. The electrical connection lead 13 of the drive element 3 is connected to an electrical connection 16 secured in the block 10.

This device is manufactured so that in the body 9 first the conical chamber 2 with the narrow passage 4 is formed by depression, followed by the drilling of the jet nozzle duct 8. Subsequently, the metal diaphragm 1 is arranged on the body 9 and the assembly is introduced into a holder 20 in this position (see the FIGS. 6 and 7). The holder 20 comprises openings 21 whose edges are adapted to the contour to be welded. Subsequently, the welded joint is formed along this contour by means of an electron beam or a laser beam. The contour of the welded joint is shaped as a key hole. Preferably, the welded joint starts at the point A (FIG. 2) and proceeds via the narrow passage, around the pressure chamber and back to the narrow passage and the starting point A. It is thus achieved that the first part of the welded joint realized at the area of the narrow passage has already cooled down when the other side of the narrow passage is welded. In accordance with the geometry of the pressure chamber and the narrow passage, the welded joint consists of the two portions 14 and 15 which are interconnected by way of a connection 12.

Figure 3:
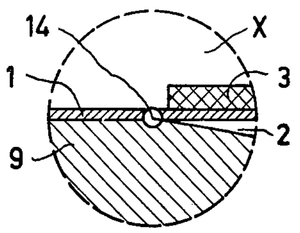
FIG. 3 shows the detail X of FIG. 1 at an enlarged scale.

As appears from FIG. 3, the welded joint 14 does not penetrate very deeply into the body 9. The thickness of the metal diaphragm 1 may be very small, for example, less than 0.1 mm. The thickness then amounts to less than half the thickness of the drive element 3. Moreover, the welded joint 12 can be made very close to the edge of the pressure chamber.

Figure 4:
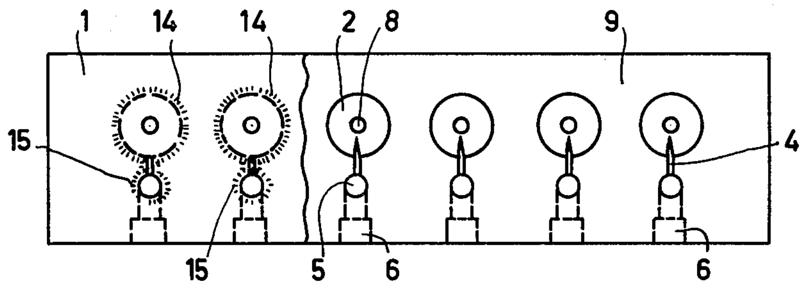
FIG. 4 is a plan view of an embodiment of an ink jet printer comprising six pressure chambers.

FIG. 4 is a plan view of an ink jet printer comprising six pressure chambers which are arranged in a row. Characters consisting of a matrix of dots can thus be printed. In the Figure the metal diaphragm extends only across two pressure chambers at the left and is subsequently broken off. The reference numerals correspond to the reference numerals used in the FIGS. 1 and 2.

Figure 5:
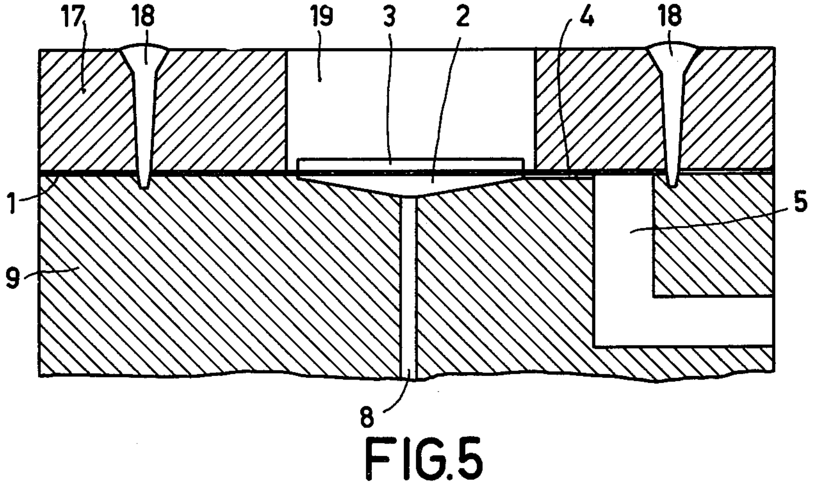
FIG. 5 is a sectional view of a further embodiment of an ink jet printer in accordance with the invention.

FIG. 5 shows a further version of the ink jet printing head in accordance with the invention. On the diaphragm 1 in this embodiment there is arranged a pressure ring 17 which is preferably made of copper and which comprises a central opening 19. In this opening 19 the drive element 3 bears on the free diaphragm 1. The pressure ring 17 and the metal diaphragm 1 can be joined in one operation by energy beam welding in the described manner. A device of this kind is preferably used when a welded joint may not be situated near the edges of the pressure chamber 2 for reasons of geometry. Because the pressure ring 17 is comparatively rigid, the welded joint 18 can be situated further from the pressure chamber.

Figure 6:
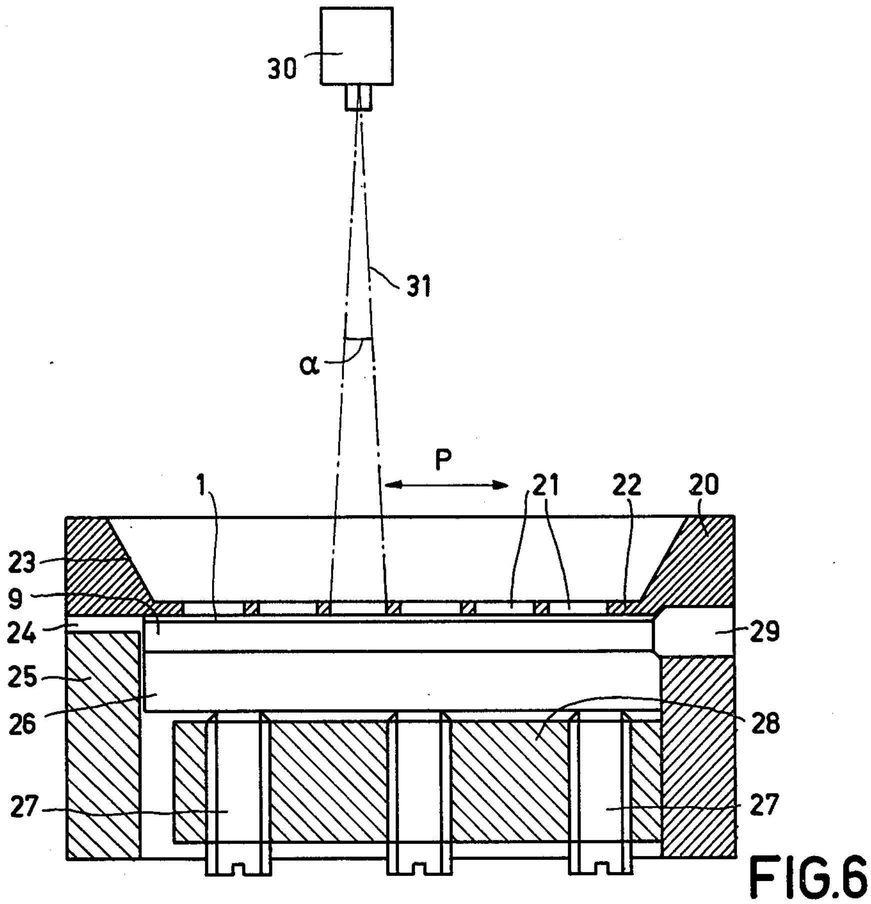
FIG. 6 is a sectional view of an embodiment of a device for performing the method in accordance with the invention.
Figure 7:
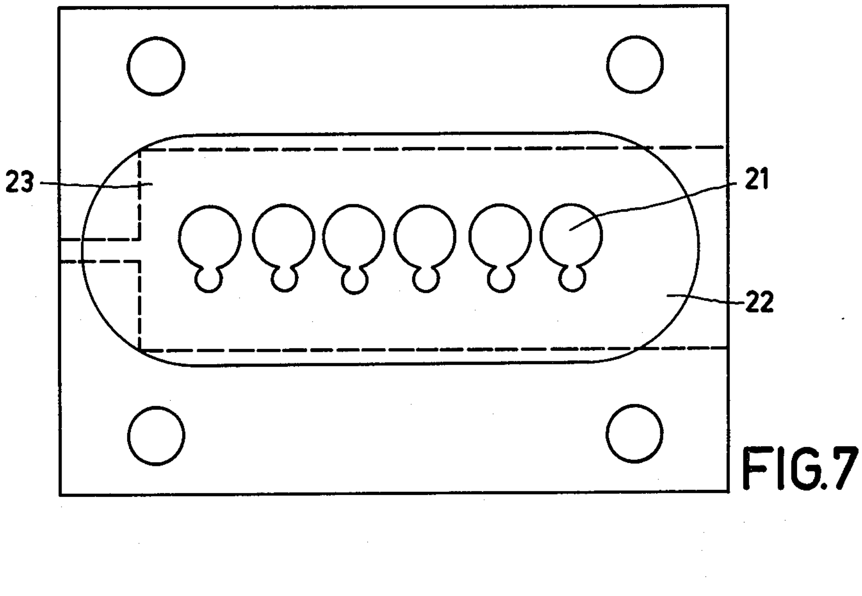
FIG. 7 is a plan view of the device shown in FIG. 6.

FIGS. 6 and 7 show a device in which the body 9 is positioned together with the diaphragm in order to be joined by means of an energy beam 31. This device consists of a holder 20, the upper wall 22 of which comprises a recessed upper side. In the upper wall 22 there are provided openings 21 which have the contour of the welded joint. The holder 20 furthermore comprises an abutment 25 which is contacted by the body 9 with the diaphragm 1 after insertion through an opening 29. In order to prevent the trapping of air when the parts are introduced, there is provided a vent 24. A screw plate with pressure screws 27 is provided at the bottom of the holder 20. When these pressure screws 27 are turned, a pressure piece 26 is slid against the body 9 which is thus positioned, together with the diaphragm 1, flatly against the lower side of the upper wall 22.

The centre line of the opening in which the welding operation must be executed can be positioned exactly underneath the centre line of the energy beam 31 of the energy beam generator 30 by displacement of the holder 20 in the direction of the arrow P. The energy beam 31 is guided along the edges of the relevant opening by deflection. The largest deflection corresponds to the angle $\alpha$ shown.

The energy beam 31 can be process-controlled. For the deflection of the energy beam 31, the side wall of the recess provided in the upper wall of the holder 20 is preferably formed as a slanted portion 23. In order to ensure suitable dissipation of heat, the holder 20 is preferably made of copper. However, it is important notably that the upper wall 22 provides good dissipation of heat.

What is claimed is:

1. A method of manufacturing an ink jet printer, comprising at least one jet nozzle whose pressure chamber is recessed in a body and is covered by a metal diaphragm on which there is arranged a drive element for the ejection of ink droplets from the jet nozzle, characterized in that the pressure chamber (2) and a narrow passage (4) are formed in the body (9) by depression, the narrow passage (4) connecting the pressure chamber (2) to a supply duct (5) for ink, the metal diaphragm (1) being connected to the body (9) in a vacuumtight manner by energy beam welding for which purpose the energy beam is guided along the edges of the pressure chamber (2) and the narrow passage (4).

2. A method as claimed in claim 1, characterized in that the energy beam is an electron beam.

3. A method as claimed in claim 1, characterized in that the energy beam is a laser beam.

4. A device for performing the method as claimed in any one of the claims 1 to 3, characterized in that it comprises a holder (20) in which the body (9) and the metal diaphragm (1) can be positioned and retained with respect to one another, said holder (20) comprising at least one opening (21) which corresponds to the contour to be welded and along the edge of which the energy beam can be guided.

5. A device as claimed in claim 4, characterized in that the holder (20) is made of a material offering suitable dissipation of heat.

6. An ink jet printer manufactured by means of the method claimed in any of the claims 1 to 3, characterized in that the narrow passage (4) which laterally opens into the pressure chamber (2) has a triangular cross-section.

7. An ink jet printer as claimed in claim 6, characterized in that one of the two electrical connection leads (11) for the drive element (3) is connected to the body (9).

8. An ink jet printer as claimed in claim 7, characterized in that over the metal diaphragm (1) there is arranged a pressure ring (17) which is secured to the body (9), together with the metal diaphragm (1), by energy beam welding.

* * * * *